(12) United States Patent
Chang et al.

(10) Patent No.: US 12,307,248 B2
(45) Date of Patent: *May 20, 2025

(54) HIGH-PERFORMANCE MULTI-LITERAL MATCHING ALGORITHM

(71) Applicant: Intel Corporation, Santa Clara, CA (US)

(72) Inventors: Hao Chang, Shanghai (CN); Xiang Wang, Shanghai (CN); Yang Hong, Shanghai (CN); Hongjun Ni, Shanghai (CN); Baoqian Li, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 910 days.

This patent is subject to a terminal disclaimer.

(21) Appl. No.: 17/212,560

(22) Filed: Mar. 25, 2021

(65) Prior Publication Data

US 2021/0208888 A1    Jul. 8, 2021

(51) Int. Cl.
G06F 9/30        (2018.01)
G06F 9/38        (2018.01)

(52) U.S. Cl.
CPC ...... *G06F 9/30032* (2013.01); *G06F 9/30036* (2013.01); *G06F 9/30038* (2023.08); *G06F 9/3887* (2013.01)

(58) Field of Classification Search
CPC . G06F 9/3887; G06F 9/30036; G06F 9/30032
USPC ...................................................... 712/225
See application file for complete search history.

(56) References Cited

U.S. PATENT DOCUMENTS

| 8,527,272 | B2 * | 9/2013 | Qin ........................ G06F 40/45 704/254 |
| 2008/0022403 | A1 * | 1/2008 | Chen .................... H04L 63/1416 726/25 |
| 2015/0026194 | A1 * | 1/2015 | Dziedzicki .......... G06F 16/3344 707/748 |

OTHER PUBLICATIONS

Wang et al., "Hyperscan: A Fast Multi-pattern Regex Matcher for Modern CPUs", This paper is from the 16th USENIX Symposium on Networked Systems Design and Implementations (NSDI '19), Feb. 26-28, 2019, Boston, MA USA, 19 pages. (Year: 2019).*

* cited by examiner

*Primary Examiner* — Chun Kuan Lee
(74) *Attorney, Agent, or Firm* — Compass IP Law PC

(57) ABSTRACT

Methods, software, and apparatus for implementing a high-performance multi-literal matching algorithm. Under aspects of a method, multi-literal matching is used during front-end processing to identify match candidates based on suffix patterns. An extended SHIFT-OR algorithm is performed using the chunk of data as an input to identify match candidates for the suffix patterns, wherein the extended SHIFT-OR algorithm shifts match indicia in the plurality of rows across predetermined bit boundaries and aligns the match indicia corresponding to target suffixes into single columns. Match candidates are indicated when OR'ed column values yield a '0'. Match verification for one or more search strings containing the suffix patterns is then performed by a back-end. The scheme eliminates false positives at the predetermined bit boundaries, providing substantial improvement in front-end accuracy and performance.

20 Claims, 12 Drawing Sheets

Bucket0: ...
Bucket1: "can"(0x63,0x61,0x6e)
nibbles: 0x3, 0x6, 0x1, 0x6, 0xe, 0x6

| nib val | 0 | 1 | 2 | 3 | 4 | 5 | 6 | 7 | 8 | 9 | a | b | c | d | e | f |
|---|---|---|---|---|---|---|---|---|---|---|---|---|---|---|---|---|
| -3 lo | 11 | 11 | 11 | 10 | 11 | 11 | 11 | 11 | 11 | 11 | 11 | 11 | 11 | 11 | 11 | 11 |
| -3 hi | 11 | 11 | 11 | 11 | 11 | 11 | 11 | 11 | 11 | 11 | 11 | 11 | 11 | 11 | 11 | 11 |
| -2 lo | 11 | 11 | 11 | 11 | 11 | 11 | 11 | 11 | 11 | 11 | 11 | 11 | 11 | 11 | 11 | 11 |
| -2 hi | 11 | 11 | 11 | 11 | 11 | 11 | 11 | 11 | 11 | 11 | 11 | 11 | 11 | 11 | 11 | 11 |
| -1 lo | 11 | 11 | 11 | 11 | 11 | 11 | 11 | 11 | 11 | 11 | 11 | 11 | 11 | 11 | 11 | 11 |
| -1 hi | 11 | 11 | 11 | 11 | 11 | 11 | 11 | 11 | 11 | 11 | 11 | 11 | 11 | 11 | 11 | 11 |

HIGH-PERFORMANCE MULTI-LITERAL MATCHING ALGORITHM

BACKGROUND INFORMATION

Literal matching is widely used in scenarios such as network I/O (Input/Output), network intelligence, DPI, WAF, etc. Hyperscan is a high-performance regex matching library, and its world's fastest multi-literal matching algorithm plays a key role of its performance. Hyperscan is described in detail in Wang, Xiang, et al. "Hyperscan: a fast multi-pattern regex matcher for modern CPUs." 16th {USENIX} *Symposium on Networked Systems Design and Implementation* ({NSDI} 19). 2019. Hyperscan's current fastest multi-literal matching algorithm is named "Teddy." Teddy is a SIMD (Single Instruction Multiple Data) accelerated multiple substring matching algorithm.

Hyperscan Teddy consists of two parts: a very fast front-end applying SIMD instructions to find match candidates (input regions ending with target suffixes) in input data, and a relatively slower back-end that confirms all match candidates from front-end to guarantee the correctness of the match candidates. The front-end speed and front-end accuracy are two key factors to overall performance of Teddy. While Teddy has very fast front-end speed, it suffers from front-end accuracy loss.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified:

FIG. 4 shows an example of a match table using a nibble-based masks;

FIG. 5 shows a set of tables corresponding to a Teddy example using an input of "TeddyinHyperscan";

FIGS. 7-9 illustrate an example of false positives produced at 128-bit boundaries using Teddy, where FIG. 7 shows a table lookup result for an input data sequence 'a b y' appearing at each 128-bit boundary, with 'a b' in previous 128-bit region and 'y' in next region, FIG. 8 shows the expected SHIFT-OR result, and FIG. 9 shows resulting false positives due to padding zeros brought by the VPSLLDQ instruction at the 128-bit boundaries;

FIG. 13 is a diagram illustrating an example of a false positive at the 0-bit position;

FIG. 14 is a diagram illustrating an example of an "overlapped load" shift used to prevent false positives at the 0-bit position;

DETAILED DESCRIPTION

Figures 1, 2:
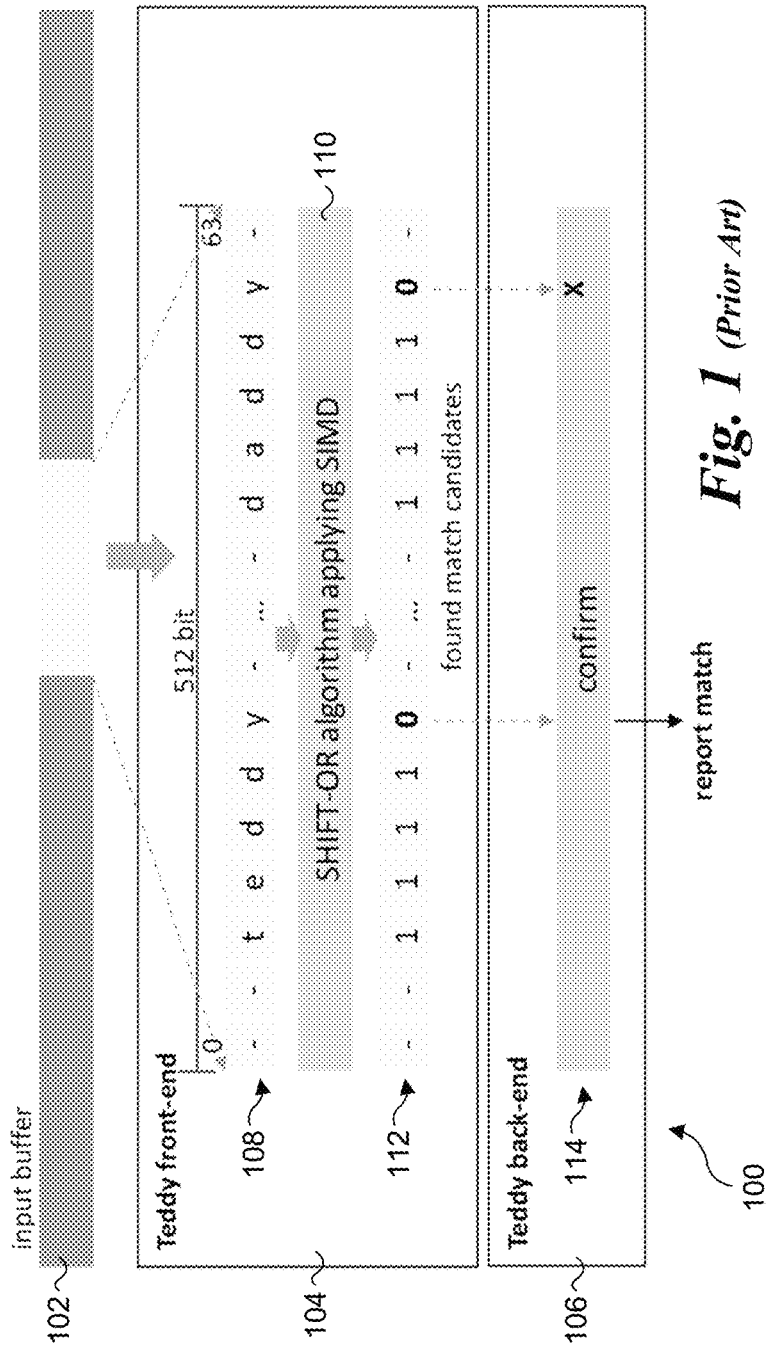
FIG. 1 is a diagram illustrating the high-level workflow for the Teddy algorithm.
FIG. 2 is a diagram illustrating an example of a SHIFT-OR mask table for a 3-byte suffix of 'd d y'.

Embodiments of methods, software, and apparatus for implementing a high-performance multi-literal matching algorithm are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

For clarity, individual components in the Figures herein may also be referred to by their labels in the Figures, rather than by a particular reference number. Additionally, reference numbers referring to a particular type of component (as opposed to a particular component) may be shown with a reference number followed by "(typ)" meaning "typical." It will be understood that the configuration of these components will be typical of similar components that may exist but are not shown in the drawing Figures for simplicity and clarity or otherwise similar components that are not labeled with separate reference numbers. Conversely, "(typ)" is not to be construed as meaning the component, element, etc. is typically used for its disclosed function, implement, purpose, etc.

The embodiments described and illustrated herein provide improvements to Teddy by eliminating false positives at 128-bit boundaries through uses of a 512-bit SIMD instruction that performs a shift operation based on a control vector. This new approach improves both front-end accuracy and front-end speed, which in turn increases overall speed of Teddy and overall Hyperscan performance.

Hyperscan's multi-literal matcher Teddy consists of two parts: front-end and back-end. The front-end uses SIMD instructions to filter out most data that do not generate any match, such that only match candidates will enter back-end for confirmation. The back-end determines the final result: match or not.

A diagram 100 illustrating Teddy's workflow is shown in FIG. 1, which includes an input buffer 102 a front-end 104, and a back-end 106. A 512-bit input string 108 (also referred to as a 512-bit 'vector') is sampled from an input buffer 102. For example, in a common implementation input buffer 102 represents a sliding window (e.g., an input sample) of a bitstream that is being processed for matches. A SHIFT-OR algorithm 110 is applied to 512-bit string 108 using an SIMD instruction. For example, some Intel® Xeon® processors support a 512-bit SIMD instruction for implementing a SHIFT-OR algorithm.

The SHIFT-OR algorithm finds all occurrences of a string pattern in the input string or bitstream sample by performing bit-wise SHIFT and OR operations. It uses two data structures—a shift-or mask for each character c ('c' stands for any character) in the symbol set, (sh-mask('c')), and a state mask(st-mask) for matching operation. sh-mask('c') zeros all bits whose bit position corresponds to the byte position of c in the string pattern while all other bits are set to 1. The bit position in a sh-mask is counted from the right most bit while the byte position in a pattern is counted from the left most byte. For example, for a string pattern, "aphp" sh-mask ('p')=11110101 as 'p' appears at the second and the fourth position in the pattern. If a character is unused in the pattern, all bits of its sh-mask are set to 1. The algorithm keeps a st-mask whose size is equal to the length of a sh-mask. Initially, all bits of the st-mask are set to 1. The algorithm updates the st-mask for each input character, 'x' as st-mask= ((st-mask«1)|sh-mask('x')). For each matching input character, 0 is propagated to the left by one bit. If the zero bit position becomes the length of the pattern, it indicates that the pattern string is found.

The output of SHIFT-OR algorithm 110 is a 512-bit match pattern 112 that identifies (finds) match candidates for confirmation by back-end 106. The match candidates comprise sequences of '1's followed by a '0' (indicating a match). In this example, the two found match candidates are 't e d d y' and 'd a d d y'.

512-bit match pattern 112 is provided as an input to match confirmation logic 114 in back-end 106. The match confirmation logic is confirmed to report matches. As shown in FIG. 1 the match candidate 't e d d y' is confirmed (to be a match) by match confirmation logic 114, while the match candidate 'd a d d y' is identified as a miss ('X') by match confirmation logic 114.

As described above, Teddy uses a SHIFT-OR algorithm and SIMD instructions in the front-end, which uses a character mask table to do literal matching, wherein the mask table is constructed according to the literal patterns. For performance reasons, Teddy constructs the mask table according to short suffixes of patterns. For example, it normally picks 3-byte suffixes, although more generally an n-byte suffix will work where n is 2 or more.

As an example, if we consider a literal pattern 't e d d y' whose 3-byte suffix is 'd d y', then its corresponding SHIFT-OR mask table is described in table 200 shown in FIG. 2. Table 200 has 3 rows and 256 columns, indicating the matching result of each character at each position of the suffix. A cell with value 0 means the corresponding character matches the corresponding position of the suffix.

Figure 3:
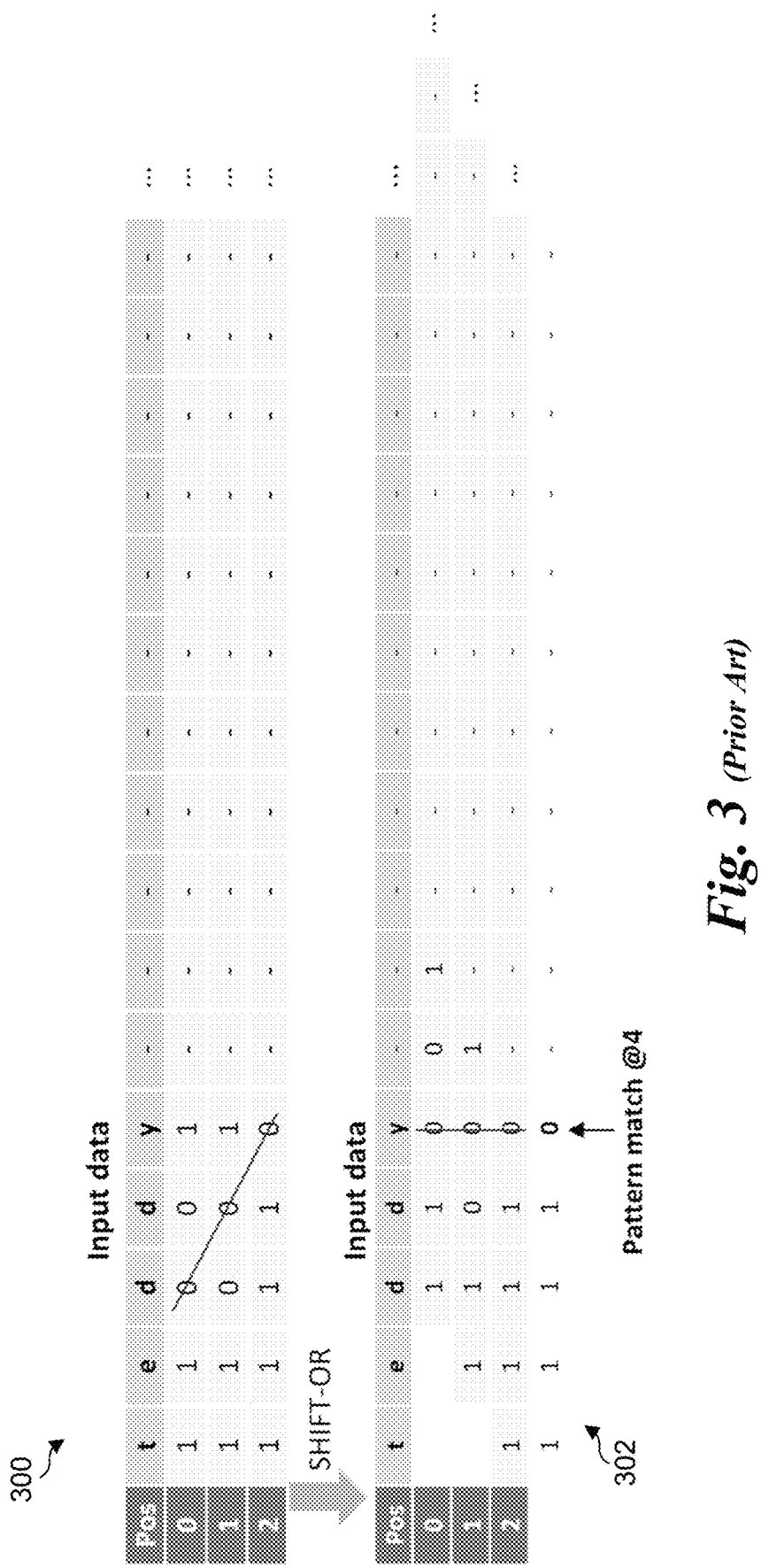
FIG. 3 is a diagram illustrating the table lookup result from the SHIFT-OR mask table of FIG. 2 and an associated SHIFT-OR result.

For example, when processing a large number of input data containing 't e d d y', FIG. 3 shows the table lookup result 300 from table 200 and the SHIFT-OR result 302, wherein the value 0 appearing in the result means there's a match candidate at input offset 4.

Match candidates generated from the Teddy front-end are called "positives," which are the offsets of '0's as shown in the last result in FIG. 3. Every positive will be sent to the back-end (e.g., back-end 106 in FIG. 1) for final confirmation, wherein the back-end will check whether it's a true positive or a false positive.

Multi-Bucket Grouping

For multiple literal patterns, we group them into different buckets according to their suffixes; normally Teddy can support up to 8 buckets by using 8 bits in each cell. Using short suffixes has less table lookups and is convenient to deal with large number of input data. Teddy can process 64 bytes of input data in one 512-bit vector, it uses a PSHUFB instruction to look up every row of a SHIFT-OR mask table according to a 64-byte chunk of data in parallel, then perform SHIFT-OR algorithm 108 to get the offsets of match candidates in this chunk.

Figure 5:
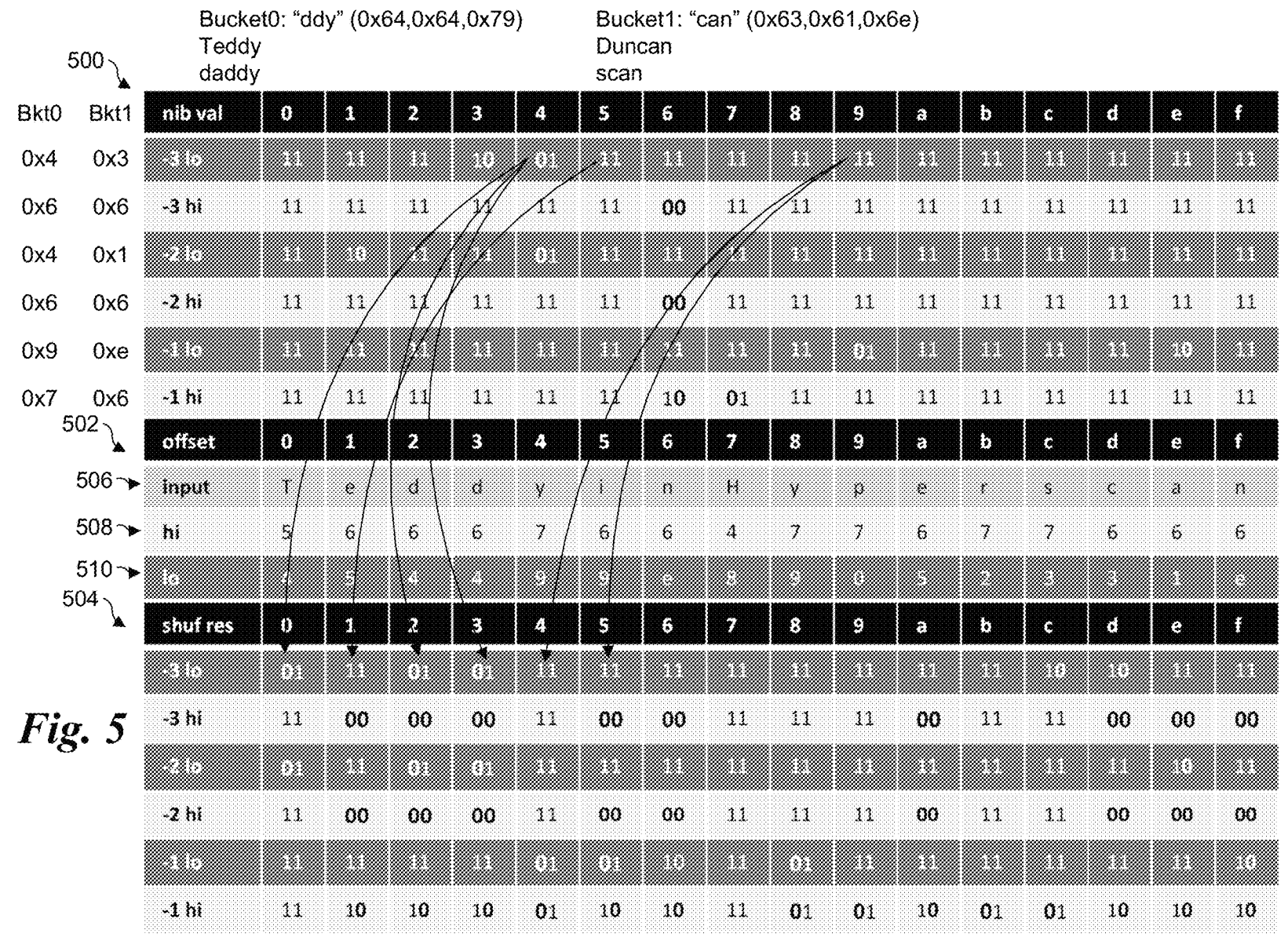
Figure 6:
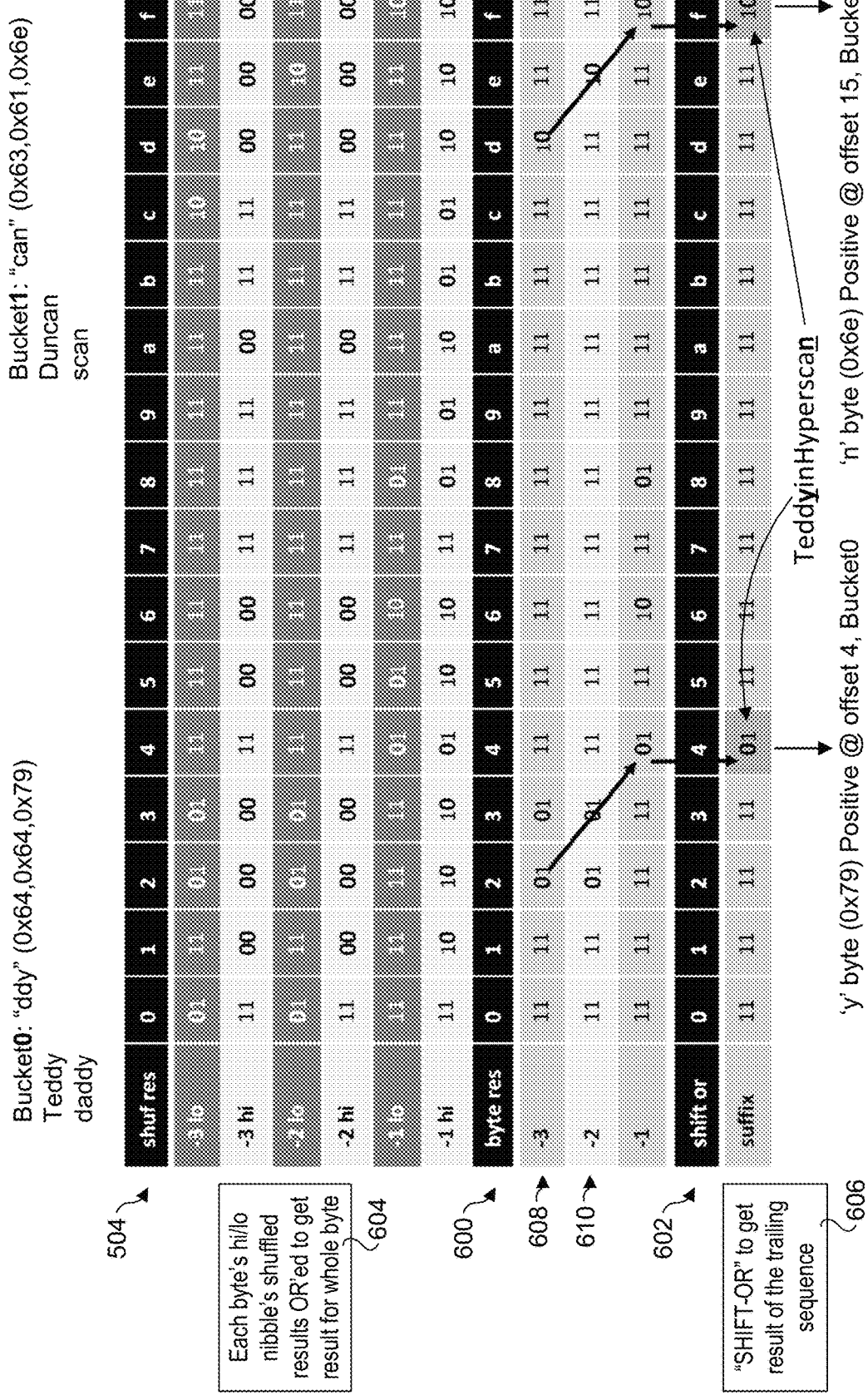
FIG. 6 shows further details of the Teddy example including a shuffle result table, a byte result table, and a SHIFT-OR output.

An example of the multiple-bucket grouping technique with two buckets (Bucket0 and Bucket1) is shown in FIGS. 4-6. In this example, the match pattern for each of Bucket0 and Bucket1 is a three-letter suffix: For Bucket0 it is undefined (for simplicity) and for Bucket1 the suffix is "can," which has a Byte sequence of 0x63, 0x61, and 0x6e. Match evaluation are made on a nibble (4-bit) basis rather than a byte-wise match; thus the nibble sequence is 0x3, 0x6, 0x1, 0x6, 0xe, and 0x6. A match table 400 in FIG. 4 includes 16 columns (each corresponding to a respective nibble value) and 6 rows. Each pair of rows contains match indicia for lo(w) and hi(gh) nibble values of a character at a given offset. Each cell 402 contains two bits, where the first bit is used for Bucket0 and the second bit is used for Bucket1.

In the exemplary set of match results depicted in table 400, there are two matches. The first match is for the lo nibble 0x3 of the letter 'c' at nibble value '3', while the second match is for the hi nibble 0x6 of the letter 'c' at nibble value '6'. (It is noted the hi and lo nibble rows for characters 'a' and 'n' have yet to be filled with valid masks in this example.)

FIG. 5 shows a Teddy example using an input of "TeddyinHyperscan." The data structures include a nibble match table 500, an offset table 502, and a shuffle result table 504. The character string in the input row 506 of offset table 502 is "TeddyinHyperscan." As shown at the top of FIG. 5, the Bucket0 match results are for the suffix "ddy" that is matched against example strings "Teddy" and "daddy" including suffix "ddy." The Bucket1 match results are for the suffix "can" that is matched against example strings "Duncan" and "scan" including suffix "ddy." The bucket assignments are according to the trailing characters. The nibble masks are constructed for each nibble of the trailing characters. Each 16 bytes of input is separated by the hi nibble and low nibble, and used as a shuffle mask.

As discussed above, a value of '0' in a cell represents a match, while a value of '1' indicates a miss, with the first value for a given cell corresponding to Bucket0 and the second value corresponding to Bucket1. A hi shuffle vector 508 and a lo shuffle vector 510 are respectively applied to each of the hi and low nibble rows in nibble match table 500 to produce the results in shuffle result table 504. For example, the first shuffle vector value of '5' for lo shuffle vector 510 means to take the result of lo nibble for the corresponding row and copy it to the shuffle result entry. Similar shuffle results or shown for the positions 1-5 of the first row of shuffle result table 504.

FIG. 6 shows further processing of shuffle result table 504 to obtain a byte result table 600 that is "SHIFT-OR'ed" to obtain a suffix match table 602. The strings to match are the same as in FIG. 5. As shown in a block 604, to obtain byte result table 600, each byte's hi/lo nibble's shuffled results are OR'ed to get the result for whole byte. A SHIFT-OR operating is then applied in a block 606 to get the result of the trailing sequence. The suffix row in suffix match table 602 shows a match for Bucket0 at an offset of 4 corresponding to the fifth letter 'y' in "TeddyinHyperscan" and a match for Bucket1 at an offset of 15 corresponding to the $16^{th}$ letter 'n' in "TeddyinHyperscan."

The SHIFT part of the SHIFT-OR operation comprises shifting all the rows corresponding to the suffix in the bytes result table 600 so they are aligned. In this case, the −3 row 608 having an offset of three letters back is shifted to the right two columns, and the −2 row 610 having an offset of two letters back is shifted to the right on column. The entries in the columns are then OR'ed.

Reducing False Positives caused by SHIFT

The false positives generated from the front-end are due to an inherent weakness of the SHIFT operation. This weakness is addressed by the novel techniques employed in the embodiments herein referred to as "VBMI Teddy."

Under one current implementation, Teddy leverages a "VPSLLDQ" processor instruction available for some Intel® processors to do the SHIFT operation. The problem with this approach is useful information cannot pass the 128-bit boundaries: The VPSLLD instructions will fill padding zeroes at each 128-bit boundary during shifting. These padding zeroes may produce false positives.

Figures 7, 8, 9:
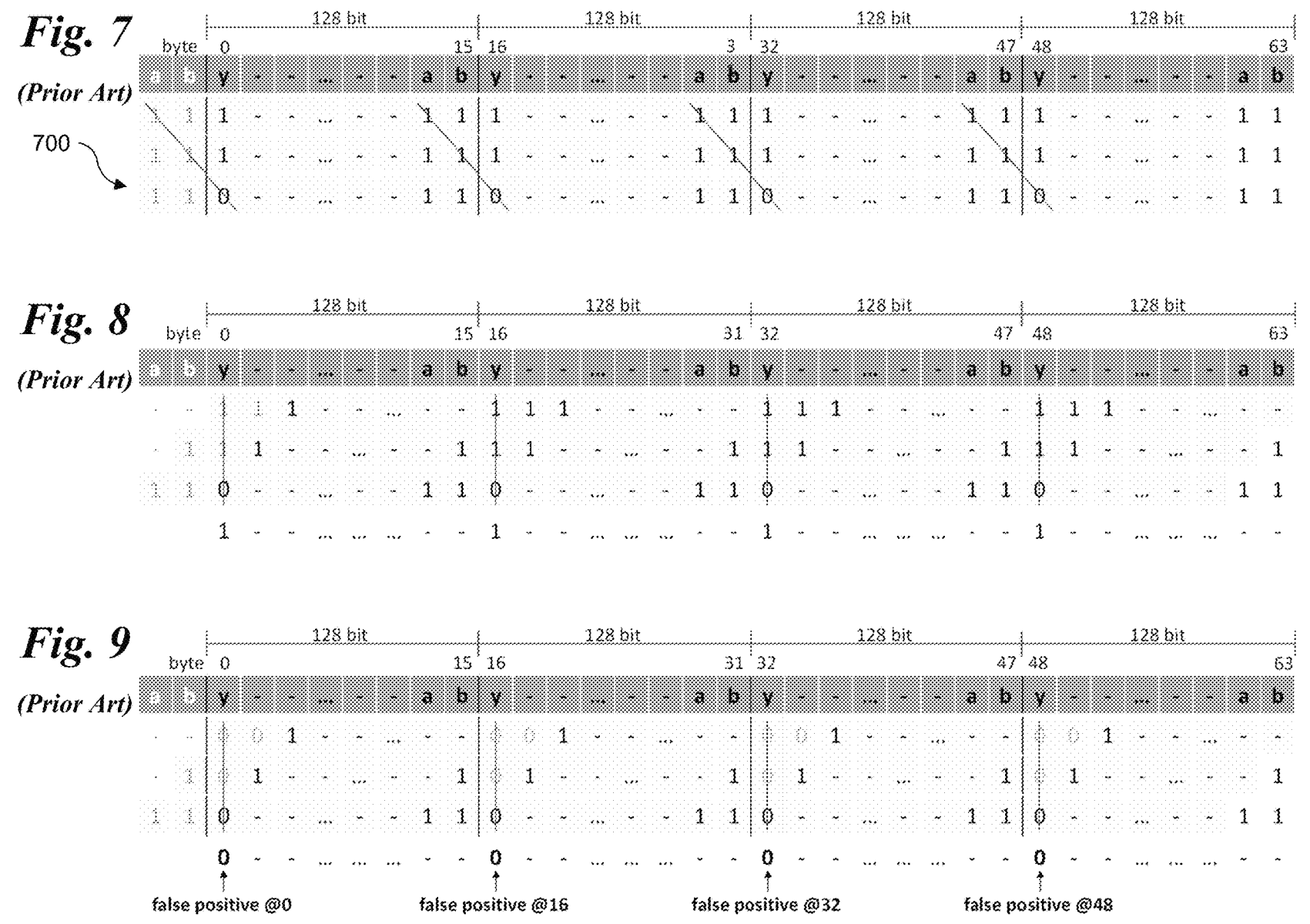

For example, consider the situation illustrated by the table lookup result shown in table 700 of FIG. 7 when the input data has a sequence 'a b y' appear at each 128-bit boundary, with 'a b' in previous 128-bit region and 'y' in next region. As shown by the expected SHIFT-OR result in FIG. 8 (depicted by outputs '1'), there should be no positives at Byte offsets 0, 16, 32 and 48. But due to padding zeros brought by VPSLLDQ instruction at these 128-bit boundaries, the actual SHIFT-OR result is like that shown in FIG. 9. Although at each Byte offset 0, 16, 32, 48 there only is a match for the last character 'y' of 'd d y', the front-end reports these as match candidates to the back-end. There is the potential for a similar result to happen in every 64-byte chunk of input data (depending on the Byte (character) sequences at the 128-bit boundaries). In practice, Teddy has high false positive counts, which results in reduced overall performance.

VBMI Teddy Algorithm

Figure 10:
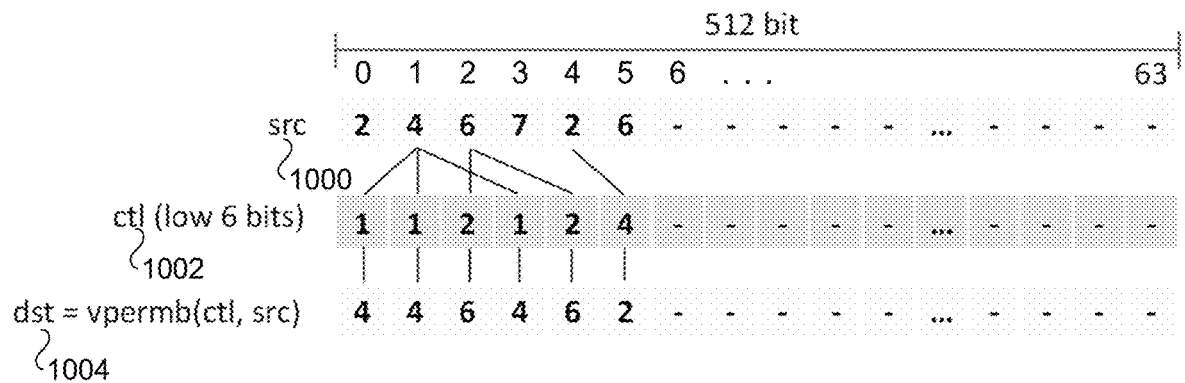
FIG. 10 is a diagram illustrating a first use of a VPERMB (Permute Packed Bytes Elements) instruction using a first control vector.

The novel VBMI Teddy algorithm in accordance with embodiments disclosed herein leverages a recently-introduced instruction to solve Teddy's false positive problem. The instruction, called the "VPERMB" (Permute Packed Bytes Elements) instruction, can be implemented to perform a byte-level shuffle in a 64-byte source vector according to a 64-byte control vector. An example of this is shown in FIG. 10, which depicts a src operand comprising a 64-byte source vector 1000 and a ctl operand comprising a 64-byte control vector 1002, and a dst (destination) 1004 representing the output resulting from execution of the VPERMB instruction using src operand and ctl operand.

Each byte in the 64-byte control vector identifies the lowest 6 bits of the byte-offset from the beginning of the 64-byte source vector, as shown in the byte-offset values 0, 1, 2, 3, 4, 5, 6 . . . above 64-byte source vector 1000. For example, the source vector value in the '1' byte offset position is '4'. Thus, for every instance of '1' in 64-byte control vector 1002, the output (dst 1004) is a 4. Similarly, for every instance of '2' in 64-byte control vector 1002, the output for dst 1004 is a 6.

Figure 11:
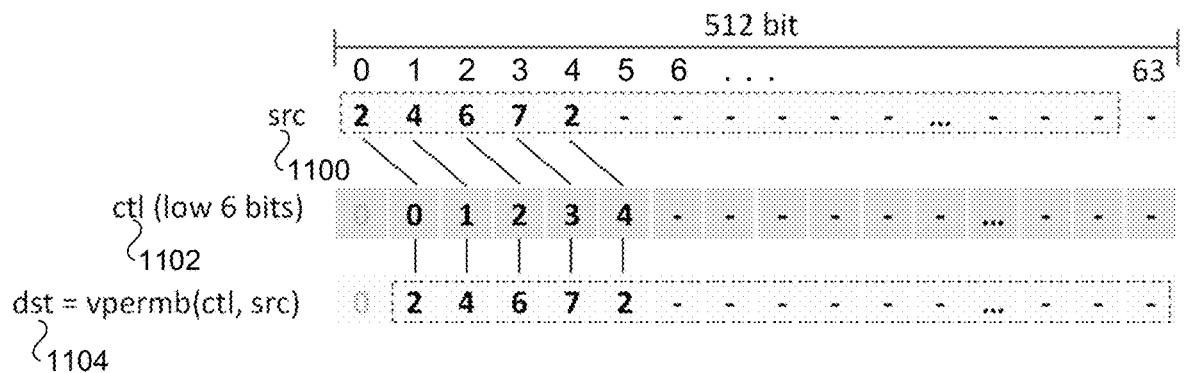
FIG. 11 is a diagram illustrating a second use of the VPERMB instruction using a second control vector used to shift the src row by one position to the left.
Figure 12:
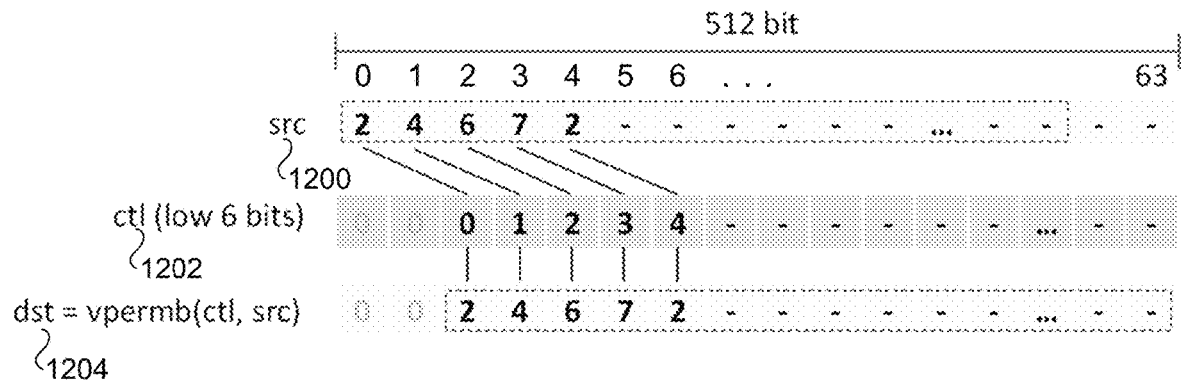
FIG. 12 is a diagram illustrating a third use of the VPERMB instruction using a third control vector used to shift the src row by two positions to the left.

As shown in FIG. 11, the VPERMB instruction can be leveraged to do a SHIFT operation by setting a control vector 1102 to a sequence 0, 1, 2, 3, 4 . . . . At the 64 byte offset boundaries, the sequence is repeated, since only the lowest 6 bits of the byte offset are used. Using this approach, the SHIFT operation is enabled to cross the 128-bit boundaries. In FIG. 11, the VPERMB instruction performs a left SHIFT to shift src vector 1100 by 1 byte, with the result shown by dst 1104. As shown in FIG. 12, a control vector 1202 is defined to shift the source vector 1200 by 2 bytes, with the result shown by dst 1204.

Figures 13, 14:
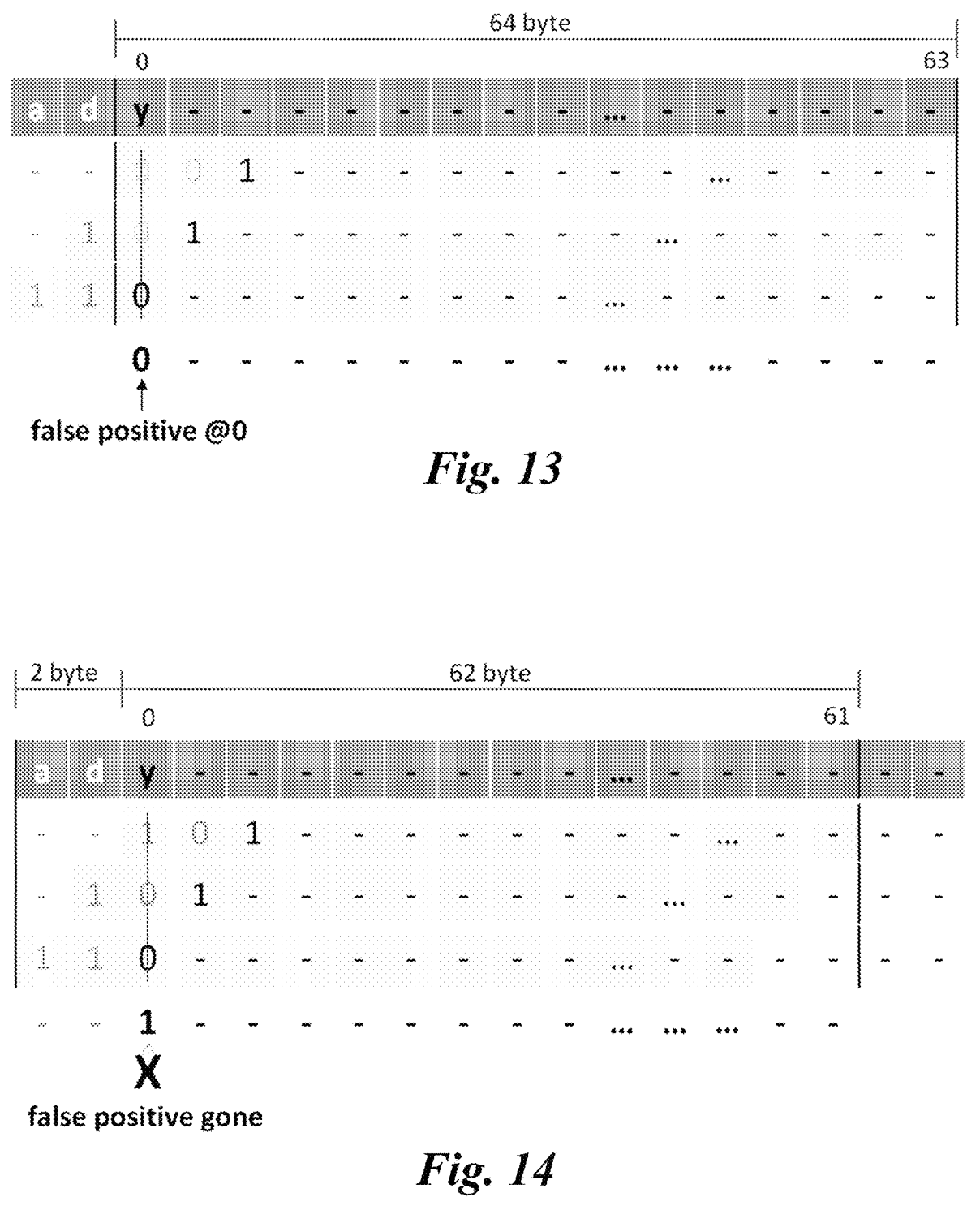

Leveraging the VPERMB instruction addresses the front-end accuracy issue at offset 16, 32 and 48 of each 64-byte chunk, and thus these positions' accuracies will be better than the convention Teddy algorithm. However, this still leaves weakness at offset 0 of each chunk. As shown in FIG. 13, the output at offset 0 (the beginning of the 64-byte chunk) is a '0', indicating a match. However, for this example we are presuming there is not a match ('a d y' is not a match), and the '0' is a false positive. To address this weakness at offset 0, the foregoing algorithm is further enhanced, as follows:

In accordance with one embodiment, an "overlapped load" is provided to recover the accuracy at the beginning of each chunk, which uses an unaligned load for each 64-byte chunk containing 2 bytes in the previous 64-byte chunk and 62 bytes in the current chunk. As a result, the matching states of last 2 bytes in previous chunk will not get lost through SHIFT at the beginning. An example of the 2-byte overlap is shown in FIG. 14. When the last two bytes 'a' and 'd' are added to the start of the chunk, the modified VBMI Teddy front-end correctly identifies 'a d y' as a miss (non-match).

Figure 15:
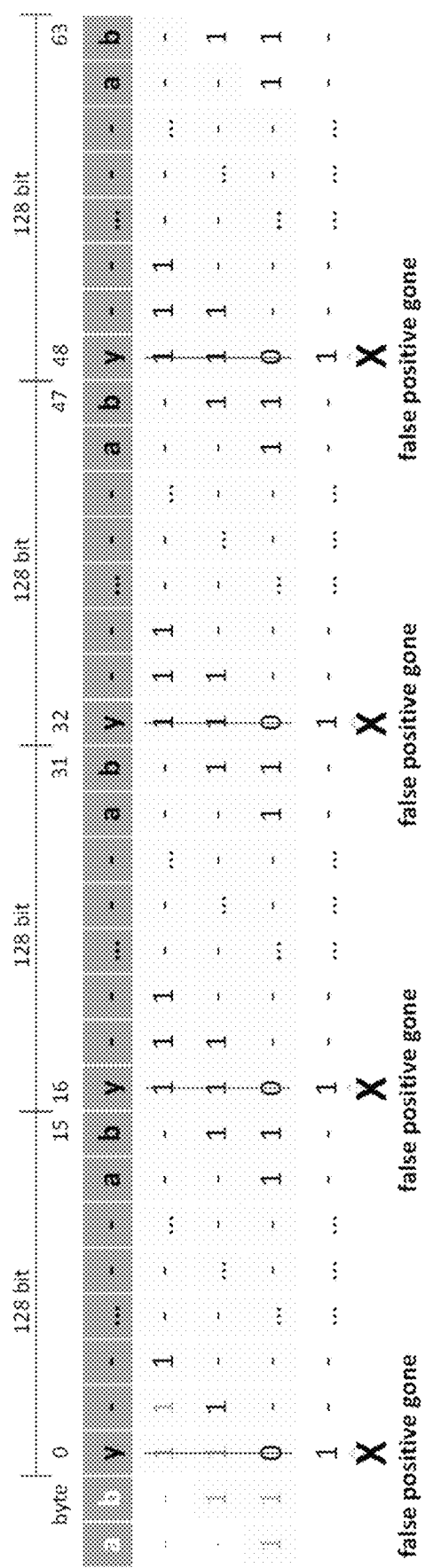
FIG. 15 is a diagram illustrating an example of false positives being prevented at 128-bit boundaries.

FIG. 15 shows the combination of the two techniques leads to elimination of the false positives at each of the 128-bit boundaries. A similar approach can be extended to apply to multi-bucket matching, such as using buckets with 8 suffix patterns at a time. In this instance, OR'ing is applied at the bit level within the cells.

Figure 16:
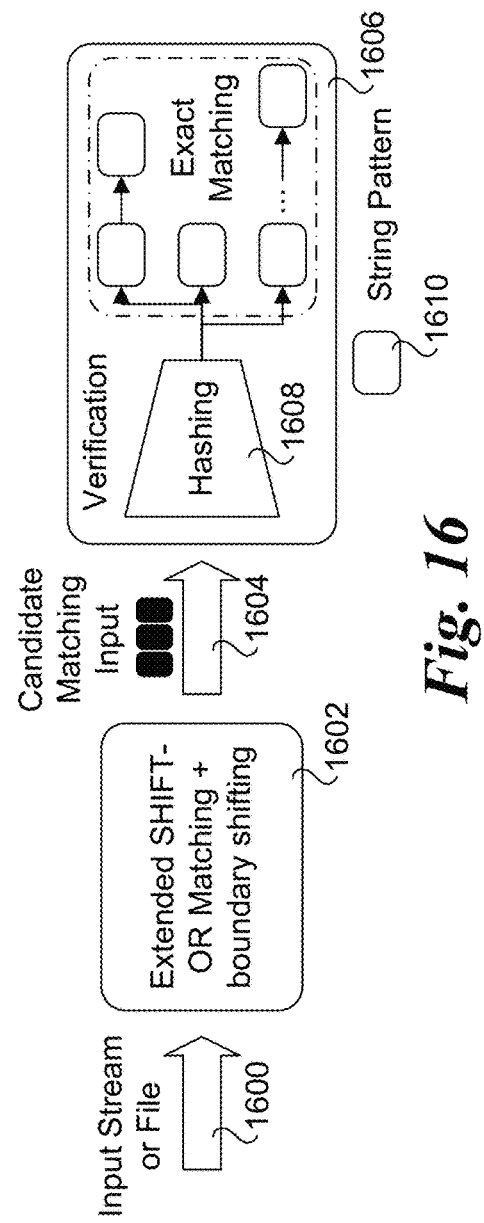
FIG. 16 is a diagram illustrating a workflow using the VBMI Teddy algorithm.

FIG. 16 shows the overall flow for performing search string pattern matching using the advanced multi-literal scheme disclosed herein. The process is applied to an input character stream or may be applied to stored files and documents, as depicted by an input 1600. In a block 1602, an extended SHIFT-OR algorithm employing boundary shifting is applied by the front-end. The result of the front-end operations is a set of match candidates 1604, which are provided as input to the back-end 1606, which performs exact string pattern matching. Back-end 1606 applies hashing 1608 to the match candidates, and then uses string patterns 1610 to perform exact matching.

Figure 17:
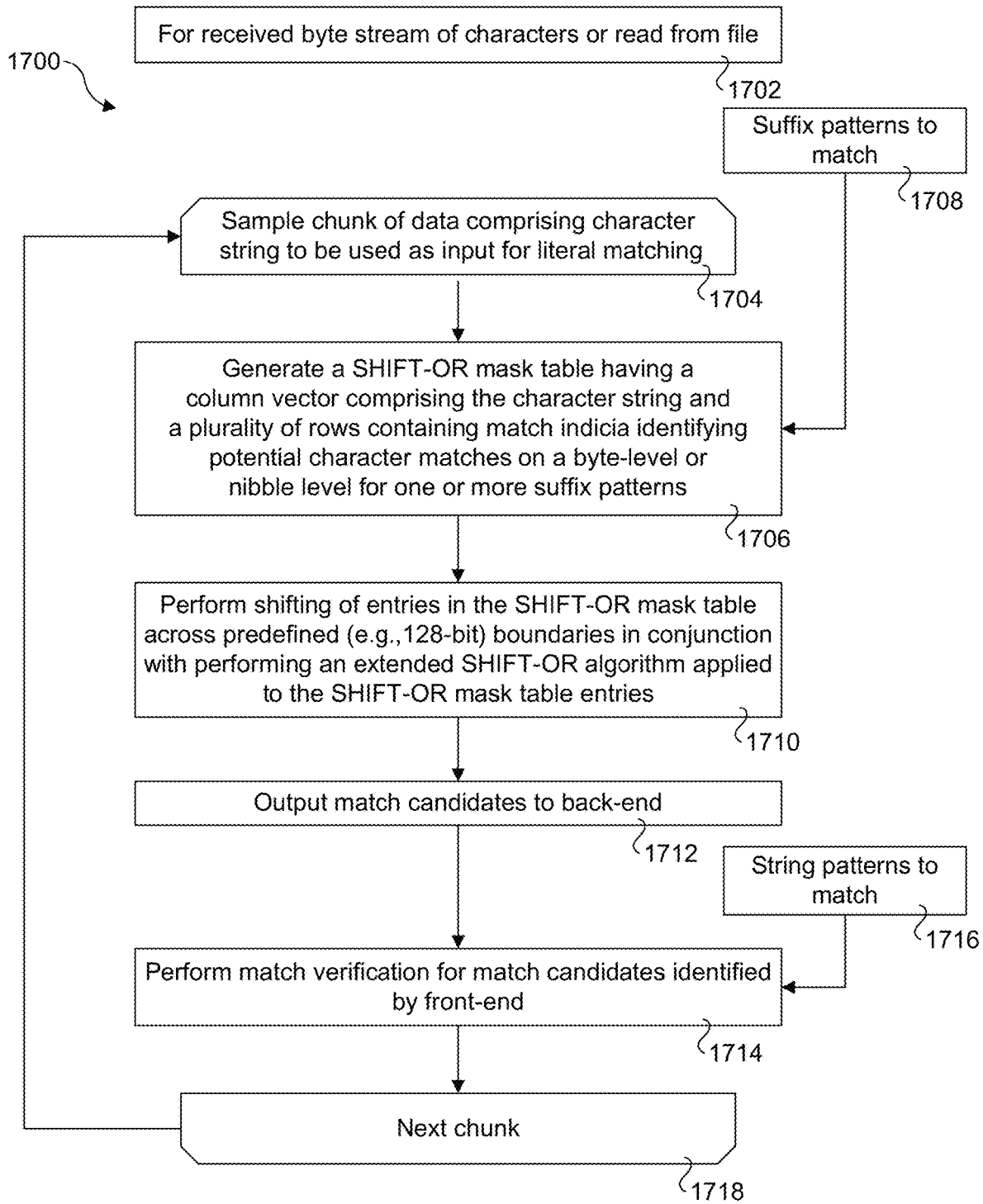
FIG. 17 is a flowchart illustrating operation performed by the VBMI Teddy algorithm.

FIG. 17 shows a flowchart 1700 illustrating further details of the operations used by the extended SHIFT-OR algorithm. As shown in a block 1702, the operation are performed for a received byte stream or may be applied to stored file or documents. As depicted by a start loop block 1704 and an end loop block 1718, the operations of blocks 1704, 1706, 1710, 1712, and 1714 are performed for each of multiple chunks of data sampled from the byte stream or file.

The chunk of data comprises a character string having a size n, such as 64 bytes. The character string is used as a column vector, which each character in the n-byte chunk occupies a respective column in a SHIFT-OR mask table generated in a block 1706 using, in part, the 512-bit SIMD instructions described above. The other input to block 1706 is a set of suffix match patterns 1708. The rows of the SHIFT-OR mask table contain match indicia identifying actual (at the byte level) or potential (at the nibble level) character matches for the suffix match patterns.

In a block 1710, shifting of entries in the SHIFT-OR mask table is performed across the 128-bit (16 byte) boundaries in conjunction with performing the extended SHIFT-OR algorithm to the SHIFT-OR mask table entries. In one embodiment the VPERMB instruction is used with a control vector that results in shifting the match indicia in the table rows by m-l, where m is the length of the suffix patterns. The operations in block 1710 also include the "overlapped load" illustrated in FIG. 14 and discussed above. The amount of overlap is k, where k=m-l. The results in k bytes of the prior chunk and n-k bytes of the current chunk. The output of block 1710 is the match candidates, which are provided to the back-end.

As described and illustrated above, a bucket scheme employing multiple suffix match patterns may be used to perform the operations in parallel. Moreover, the operations in blocks 1706 and 1710 may be performed either sequentially or in a distributed manner for multiple sets of suffix patterns.

As shown in a block 1712, block 1710 outputs a set of match candidates to the back-end, where the match candidates are suffix patterns for which the matches have been detected using the extended SHIFT-OR algorithm. In a block 1714 match verification for the match candidates identified by the front end is performed against string patterns to match 1716. For example, in one embodiment match verification is performed in the manner described above for back-end 1606 in FIG. 16. The process then loops back from end loop block 1718 to start loop block 1704 to evaluate the next chunk of data.

Listing 1 shows pseudocode for implementing the VBMI Teddy Algorithm, according to one embodiment.

Figure 18:
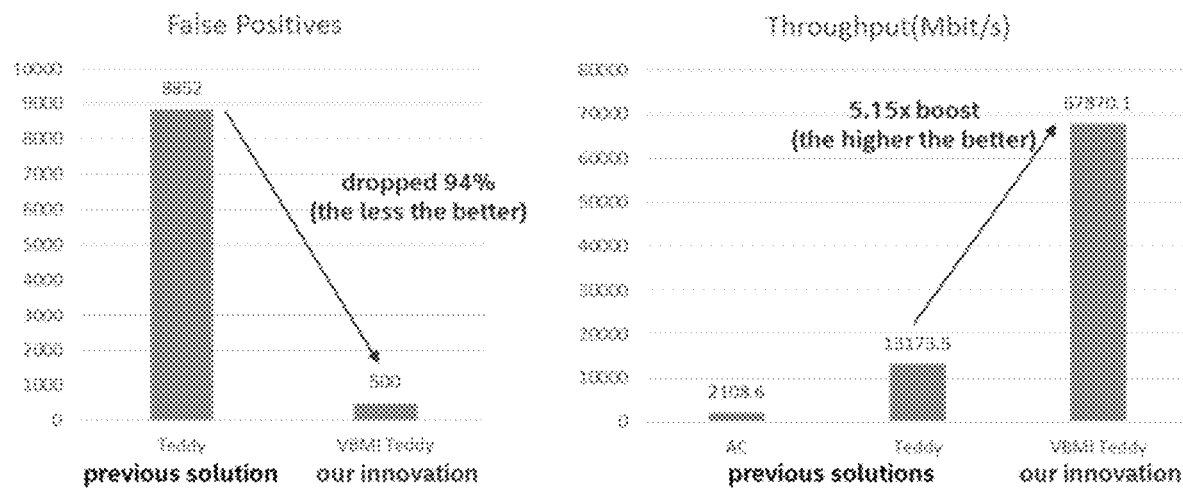
FIG. 18 shows a pair of graphs illustrating a reduction in false positives and improvement in throughput observed during benchmark testing.
Figure 19:
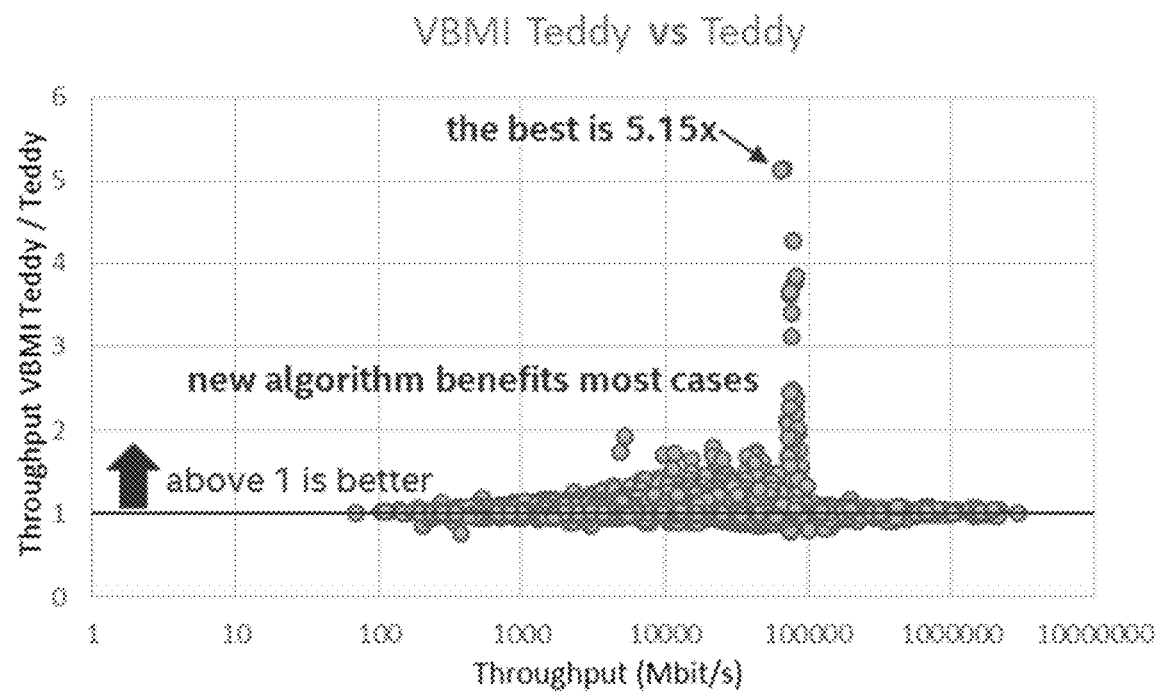
FIG. 19 is a scatter graph showing VBMI Teddy throughput compared with convention Teddy throughput.

LISTING 1
1. ctl_msk1=0x3e3d3c . . . 31302f2e . . . 21201f1e . . . 11100f0e . . . 0302010000
2. ctl_msk2=0x3d3c . . . 31302f2e . . . 21201f1e . . . 11100f0e . . . 030201000000
3. for each 62-byte chunk (start pointer p) of input data
4. //overlapped load
5. val=load512(p−2)
6. //get low nibbles in each byte
7. lo=bitwise_and(val, lo_msk)//lo_msk=0x0f0f0f . . . 0f
8. //get high nibbles in each byte
9. hi=bitwise_and(bitwise_rshift(val, 4), lo_msk)
10. //PSHUFB to get nibble-level match result, then OR to get byte-
11. level match result
12. shuf_or_b0=bitwise_or(pshufb(nib_msk[0], lo), pshufb(nib_msk[1],
13. hi))
14. shuf_or_b1=bitwise_or(pshufb(nib_msk[2], lo), pshufb(nib_msk[3],
15. hi))
16. shuf_or_b2=bitwise_or(pshufb(nib_msk[4], lo), pshufb(nib_msk[5],
17. hi))
18. //SHIFT-OR: do byte-level LEFT SHIFT to shuf_or_b1 and
19. shuf_or_b2, 19. then OR together
20. s11=vpermb(ctl_msk1, shuf_or_b1)//left shift shuf_or_b1 by 1
21. byte
22. s12=vpermb(ctl_msk2, shuf_or_b2)//left shift shuf_or_b2 by 2
23. bytes
24. res=bitwise_or(s12, s11, shuf_or_b0)
25. //backend processes each positive in res
26. end for Benchmark Test Results Benchmark test comparing the innovative scheme described and illustrated herein with conventional Teddy and the Aho-Corasick (AC) multi-literal matching algorithm demonstrate substantial performance improvement. For example, as shown in FIG. 18, the VBMI Teddy algorithm has much less false positives from front-end (dropped 94% against Teddy), and the throughput achieved up to a 5.15× boost compared to Teddy, and up to 42.3× boost against the AC algorithm. FIG. 19 shows the throughput comparison result between the VBMI Teddy algorithm and conventional Teddy for large-scale performance benchmarking. As demonstrated, VBMI Teddy provides improvement in most cases, with an average improvement of 4.5% increment.

Example Use Cases

The VBMI Teddy algorithm may be used in a wide variety of use cases where an objective is to identify character strings and/or patterns in any type of alphanumeric content. The following list of use cases is exemplary and non-limiting. Search Engines and Content Search of large Corpus and Databases, Spam Filters, Intrusion Detection System, Plagiarism Detection, Bioinformatics and DNA Sequencing, Digital Forensics, Information Retrieval Systems etc. Various Packet Processing operating on Packet Payload content, including Deep Packet Inspection, Packet Filtering, Packet Switching. Uses in Virtualized Environments such as Application Routing, VM or Container Selection, and Microservices Selection. Pattern Searching of Encrypted Content including Encrypted Memory and Network Data Encryption uses.

Exemplary Computing System

Figure 20:
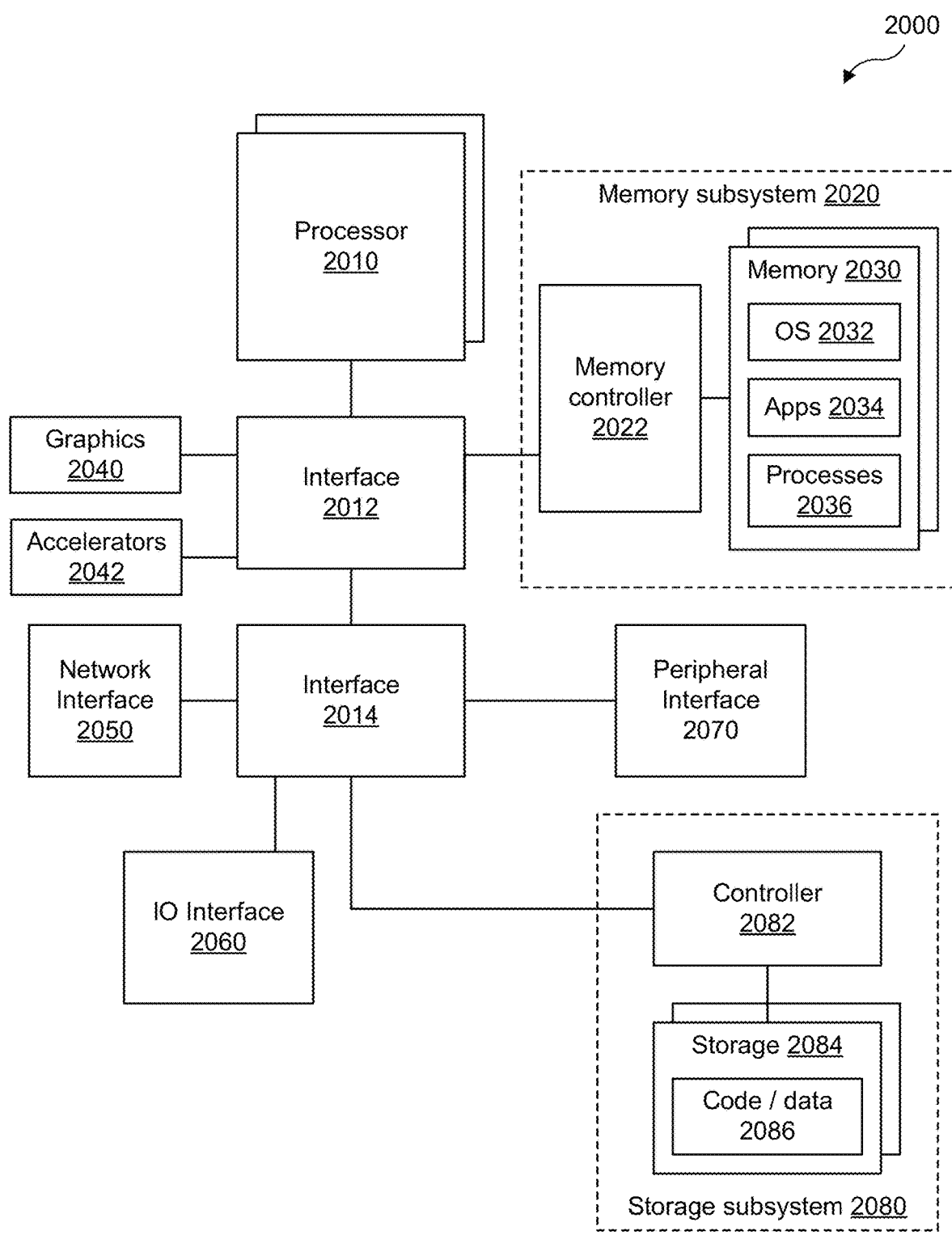
FIG. 20 is a diagram of a computing system that may be implemented with aspects of the embodiments described and illustrated herein.

FIG. 20 depicts a computing system 2000 such as a server or similar computing system in which aspects of the embodiments disclosed above may be implemented. Computing system 2000 includes one or more processors 2010, which provides processing, operation management, and execution of instructions for computing system 2000. Processor 2010 can include any type of microprocessor, central processing unit (CPU), graphics processing unit (GPU), processing core, multi-core processor or other processing hardware to provide processing for computing system 2000, or a combination of processors. Processor 2010 controls the overall operation of computing system 2000, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

In one example, computing system 2000 includes interface 2012 coupled to processor 2010, which can represent a higher speed interface or a high throughput interface for system components that needs higher bandwidth connections, such as memory subsystem 2020 or optional graphics interface components 2040, or optional accelerators 2042. Interface 2012 represents an interface circuit, which can be a standalone component or integrated onto a processor die. Where present, graphics interface 2040 interfaces to graphics components for providing a visual display to a user of computing system 2000. In one example, graphics interface

2040 can drive a high definition (HD) display that provides an output to a user. High definition can refer to a display having a pixel density of approximately 100 PPI (pixels per inch) or greater and can include formats such as full HD (e.g., 1080p), retina displays, 4K (ultra-high definition or UHD), or others. In one example, the display can include a touchscreen display. In one example, graphics interface 2040 generates a display based on data stored in memory 2030 or based on operations executed by processor 2010 or both. In one example, graphics interface 2040 generates a display based on data stored in memory 2030 or based on operations executed by processor 2010 or both.

In some embodiments, accelerators 2042 can be a fixed function offload engine that can be accessed or used by a processor 2010. For example, an accelerator among accelerators 2042 can provide data compression capability, cryptography services such as public key encryption (PKE), cipher, hash/authentication capabilities, decryption, or other capabilities or services. In some embodiments, in addition or alternatively, an accelerator among accelerators 2042 provides field select controller capabilities as described herein. In some cases, accelerators 2042 can be integrated into a CPU socket (e.g., a connector to a motherboard or circuit board that includes a CPU and provides an electrical interface with the CPU). For example, accelerators 2042 can include a single or multi-core processor, graphics processing unit, logical execution unit single or multi-level cache, functional units usable to independently execute programs or threads, application specific integrated circuits (ASICs), neural network processors (NNPs), programmable control logic, and programmable processing elements such as field programmable gate arrays (FPGAs). Accelerators 2042 can provide multiple neural networks, CPUs, processor cores, general purpose graphics processing units, or graphics processing units can be made available for use by AI or ML models. For example, the AI model can use or include any or a combination of: a reinforcement learning scheme, Q-learning scheme, deep-Q learning, or Asynchronous Advantage Actor-Critic (A3C), combinatorial neural network, recurrent combinatorial neural network, or other AI or ML model. Multiple neural networks, processor cores, or graphics processing units can be made available for use by AI or ML models.

Memory subsystem 2020 represents the main memory of computing system 2000 and provides storage for code to be executed by processor 2010, or data values to be used in executing a routine. Memory subsystem 2020 can include one or more memory devices 2030 such as read-only memory (ROM), flash memory, one or more varieties of random access memory (RAM) such as DRAM, or other memory devices, or a combination of such devices. Memory 2030 stores and hosts, among other things, operating system (OS) 2032 to provide a software platform for execution of instructions in computing system 2000. Additionally, applications 2034 can execute on the software platform of OS 2032 from memory 2030. Applications 2034 represent programs that have their own operational logic to perform execution of one or more functions. Processes 2036 represent agents or routines that provide auxiliary functions to OS 2032 or one or more applications 2034 or a combination. OS 2032, applications 2034, and processes 2036 provide software logic to provide functions for computing system 2000. In one example, memory subsystem 2020 includes memory controller 2022, which is a memory controller to generate and issue commands to memory 2030. It will be understood that memory controller 2022 could be a physical part of processor 2010 or a physical part of interface 2012. For example, memory controller 2022 can be an integrated memory controller, integrated onto a circuit with processor 2010.

While not specifically illustrated, it will be understood that computing system 2000 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a Hyper Transport or industry standard architecture (ISA) bus, a small computer system interface (SCSI) bus, a universal serial bus (USB), or an Institute of Electrical and Electronics Engineers (IEEE) standard 1394 bus (Firewire).

In one example, computing system 2000 includes interface 2014, which can be coupled to interface 2012. In one example, interface 2014 represents an interface circuit, which can include standalone components and integrated circuitry. In one example, multiple user interface components or peripheral components, or both, couple to interface 2014. Network interface 2050 provides computing system 2000 the ability to communicate with remote devices (e.g., servers or other computing devices) over one or more networks. Network interface 2050 can include an Ethernet adapter, wireless interconnection components, cellular network interconnection components, USB (universal serial bus), or other wired or wireless standards-based or proprietary interfaces. Network interface 2050 can transmit data to a device that is in the same data center or rack or a remote device, which can include sending data stored in memory. Network interface 2050 can receive data from a remote device, which can include storing received data into memory. Various embodiments can be used in connection with network interface 2050, processor 2010, and memory subsystem 2020.

In one example, computing system 2000 includes one or more IO interface(s) 2060. IO interface 2060 can include one or more interface components through which a user interacts with computing system 2000 (e.g., audio, alphanumeric, tactile/touch, or other interfacing). Peripheral interface 2070 can include any hardware interface not specifically mentioned above. Peripherals refer generally to devices that connect dependently to computing system 2000. A dependent connection is one where computing system 2000 provides the software platform or hardware platform or both on which operation executes, and with which a user interacts.

In one example, computing system 2000 includes storage subsystem 2080 to store data in a nonvolatile manner. In one example, in certain system implementations, at least certain components of storage 2080 can overlap with components of memory subsystem 2020. Storage subsystem 2080 includes storage device(s) 2084, which can be or include any conventional medium for storing large amounts of data in a nonvolatile manner, such as one or more magnetic, solid state, or optical based disks, or a combination. Storage 2084 holds code or instructions and data 2086 in a persistent state (i.e., the value is retained despite interruption of power to computing system 2000). Storage 2084 can be generically considered to be a "memory," although memory 2030 is typically the executing or operating memory to provide instructions to processor 2010. Whereas storage 2084 is nonvolatile, memory 2030 can include volatile memory (i.e., the value or state of the data is indeterminate if power is interrupted to computing system 2000). In one example, storage subsystem 2080 includes controller 2082 to interface with storage 2084. In one example controller 2082 is a physical part of interface 2014 or processor 2010 or can include circuits or logic in both processor 2010 and interface 2014.

In an example, computing system 2000 can be implemented using interconnected compute sleds of processors, memories, storages, network interfaces, and other components. High speed interconnects can be used such as: Ethernet (IEEE 802.3), remote direct memory access (RDMA), InfiniBand, Internet Wide Area RDMA Protocol (iWARP), quick UDP Internet Connections (QUIC), RDMA over Converged Ethernet (RoCE), Peripheral Component Interconnect express (PCIe), Intel® QuickPath Interconnect (QPI), Intel® Ultra Path Interconnect (UPI), Intel® On-Chip System Fabric (IOSF), Omnipath, Compute Express Link (CXL), HyperTransport, high-speed fabric, NVLink, Advanced Microcontroller Bus Architecture (AMBA) interconnect, OpenCAPI, Gen-Z, Cache Coherent Interconnect for Accelerators (CCIX), 3GPP Long Term Evolution (LTE) (4G), 3GPP 5G, and variations thereof. Data can be copied or stored to virtualized storage nodes using a protocol such as NVMe over Fabrics (NVMe-oF) or NVMe.

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other. Additionally, "communicatively coupled" means that two or more elements that may or may not be in direct contact with each other, are enabled to communicate with each other. For example, if component A is connected to component B, which in turn is connected to component C, component A may be communicatively coupled to component C using component B as an intermediary component.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Italicized letters, such as 'k', 'm', 'n', etc. in the foregoing detailed description are used to depict an integer number, and the use of a particular letter is not limited to particular embodiments. Moreover, the same letter may be used in separate claims to represent separate integer numbers, or different letters may be used. In addition, use of a particular letter in the detailed description may or may not match the letter used in a claim that pertains to the same subject matter in the detailed description.

As discussed above, various aspects of the embodiments herein may be facilitated by corresponding software and/or firmware components and applications, such as software and/or firmware executed by an embedded processor or the like. Thus, embodiments of this invention may be used as or to support a software program, software modules, firmware, and/or distributed software executed upon some form of processor, processing core or embedded logic a virtual machine running on a processor or core or otherwise implemented or realized upon or within a non-transitory computer-readable or machine-readable storage medium. A non-transitory computer-readable or machine-readable storage medium includes any mechanism for storing or transmitting information in a form readable by a machine (e.g., a computer). For example, a non-transitory computer-readable or machine-readable storage medium includes any mechanism that provides (i.e., stores and/or transmits) information in a form accessible by a computer or computing machine (e.g., computing device, electronic system, etc.), such as recordable/non-recordable media (e.g., read only memory (ROM), random access memory (RAM), magnetic disk storage media, optical storage media, flash memory devices, etc.). The content may be directly executable ("object" or "executable" form), source code, or difference code ("delta" or "patch" code). A non-transitory computer-readable or machine-readable storage medium may also include a storage or database from which content can be downloaded. The non-transitory computer-readable or machine-readable storage medium may also include a device or product having content stored thereon at a time of sale or delivery. Thus, delivering a device with stored content, or offering content for download over a communication medium may be understood as providing an article of manufacture comprising a non-transitory computer-readable or machine-readable storage medium with such content described herein.

The operations and functions performed by various components described herein may be implemented by software running on a processing element, via embedded hardware or the like, or any combination of hardware and software. Such components may be implemented as software modules, hardware modules, special-purpose hardware (e.g., application specific hardware, ASICs, DSPs, etc.), embedded controllers, hardwired circuitry, hardware logic, etc. Software content (e.g., data, instructions, configuration information, etc.) may be provided via an article of manufacture including non-transitory computer-readable or machine-readable storage medium, which provides content that represents instructions that can be executed. The content may result in a computer performing various functions/operations described herein.

As used herein, a list of items joined by the term "at least one of" can mean any combination of the listed terms. For example, the phrase "at least one of A, B or C" can mean A; B; C; A and B; A and C; B and C; or A, B and C.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A method for performing multi-literal matching, comprising:
   sampling a chunk of data from a byte stream for a document or for a stored document, the chunk of data comprising a character string comprising n bytes;
   identifying a plurality of target suffixes corresponding to respective substring patterns in one or more search strings for which string matching is to be performed;
   performing an extended SHIFT-OR algorithm using the chunk of data as an input to identify match candidates for the plurality of target suffixes, wherein the extended SHIFT-OR algorithm shifts match indicia in a plurality of rows of a SHIFT-OR mask table across predetermined bit boundaries and aligns the match indicia corresponding to target suffixes into single columns, the extended SHIFT-OR algorithm outputting zero or more match candidates; and
   performing, based on the zero or more match candidates, match verification for the one or more search strings.

2. The method of claim 1, wherein n comprises 64 bytes, and the method is performed by executing a plurality of 512-bit Single Input Multiple Data (SIMD) instructions on a processor.

3. The method of claim 2, wherein one of the plurality of 512-bit SIMD instructions comprises a VPERMB (Permute Packed Bytes Elements) instruction that performs a bit level shuffle in a 64-byte source according to a 64-byte control vector.

4. The method of claim 3, further comprising:
   for a suffix having a length of m characters, configuring the control vector to shift rows associated with the suffix by m-l cells to the right.

5. The method of claim 1, wherein the SHIFT-OR mask table employs character masks at a byte level.

6. The method of claim 1, wherein the SHIFT-OR mask table employs character masks at a nibble level.

7. The method of claim 1, wherein at least a portion of the plurality of target suffixes are grouped in buckets of 8, and wherein cells for rows in the SHIFT-OR mask table associated with a given bucket of 8 suffixes contains match indicia associated with characters in the bucket of 8 suffixes at a byte level or nibble level.

8. The method of claim 1, wherein the extended SHIFT-OR algorithm performs a shift operation corresponding to an overlapped load, wherein k bytes of a previous chunk of data are combined with n-k bytes of a current chunk of data.

9. The method of claim 1, wherein n=64 and wherein the method eliminates false positives at byte offsets of 0, 16, 32, and 48 bytes.

10. The method of claim 1, wherein the method operations are repeated for a plurality of chunks of data to identify search string matches for a document.

11. A non-transitory tangible machine-readable medium having instructions stored thereon comprising a software program or module for performing multi-literal matching of a byte stream for a document or for a stored document, wherein execution of the instructions on a processor of a computing system enables the computing system to:
    sample a chunk of data from a byte stream for a document or from a stored document, the chunk of data comprising a character string comprising n bytes;
    read a plurality of target suffixes corresponding to respective substring patterns in one or more search strings for which string matching is to be performed;
    perform an extended SHIFT-OR algorithm using the chunk of data as an input to identify match candidates for the plurality of target suffixes, wherein the extended SHIFT-OR algorithm shifts match indicia in a plurality of rows of a SHIFT-OR mask table across predetermined bit boundaries and aligns the match indicia corresponding to target suffixes into single columns, the extended SHIFT-OR algorithm outputting zero or more match candidates; and
    perform, based on the zero or more match candidates, match verification for the one or more search strings.

12. The non-transitory tangible machine-readable medium of claim 11, wherein n comprises 64 bytes, and wherein the instructions include one or more 512-bit Single Input Multiple Data (SIMD) instructions.

13. The non-transitory tangible machine-readable medium of claim 12, wherein the one or more 512-bit SIMD instructions comprises a VPERMB (Permute Packed Bytes Elements) instruction that performs a byte level shuffle in a 64-byte source according to a 64-byte control vector.

14. The non-transitory tangible machine-readable medium of claim 11, wherein the extended SHIFT-OR algorithm performs a shift operation corresponding to an overlapped load, wherein k bytes of a previous chunk of data are combined with n-k bytes of a current chunk of data.

15. The non-transitory tangible machine-readable medium of claim 11, wherein n=64 and the extended SHIFT-OR algorithm eliminates false positives at byte offsets of 0, 16, 32, and 48 bytes.

16. A computing system, comprising:
- a processor, coupled to memory, having a plurality of cores on which instructions are executed; and
- instructions comprising a software program or module for performing multi-literal matching of a byte stream for a document or for a stored document, wherein execution of the instructions on a processor of a computing system enables the computing system to:
  - sample a chunk of data from a byte stream for a document or from a stored document, the chunk of data comprising a character string comprising n bytes;
  - read a plurality of target suffixes corresponding to respective substring patterns in one or more search strings for which string matching is to be performed;
  - perform an extended SHIFT-OR algorithm using the chunk of data as an input to identify match candidates for the plurality of target suffixes, wherein the extended SHIFT-OR algorithm shifts match indicia in a plurality of rows of a SHIFT-OR mask table across predetermined bit boundaries and aligns the match indicia corresponding to target suffixes into single columns, the extended SHIFT-OR algorithm outputting zero or more match candidates; and
  - perform, based on the zero or more match candidates, match verification for the one or more search strings.

17. The computing system of claim 16, wherein n comprises 64 bytes, and wherein the instructions include one or more 512-bit Single Input Multiple Data (SIMD) instructions.

18. The computing system of claim 17, wherein the one or more 512-bit SIMD instructions comprises a VPERMB (Permute Packed Bytes Elements) instruction that performs a byte level shuffle in a 64-byte source according to a 64-byte control vector.

19. The computing system of claim 16, wherein the extended SHIFT-OR algorithm performs a shift operation corresponding to an overlapped load, wherein k bytes of a previous chunk of data are combined with n-k bytes of a current chunk of data.

20. The computing system of claim 16, wherein n=64 and the extended SHIFT-OR algorithm eliminates false positives at byte offsets of 0, 16, 32, and 48 bytes.

* * * * *